July 4, 1967     E. H. CUMPSTON, JR     3,329,024
METHOD AND MACHINE FOR INDICATING THE FIRMNESS OF A BODY
Filed Dec. 4, 1963     6 Sheets-Sheet 1
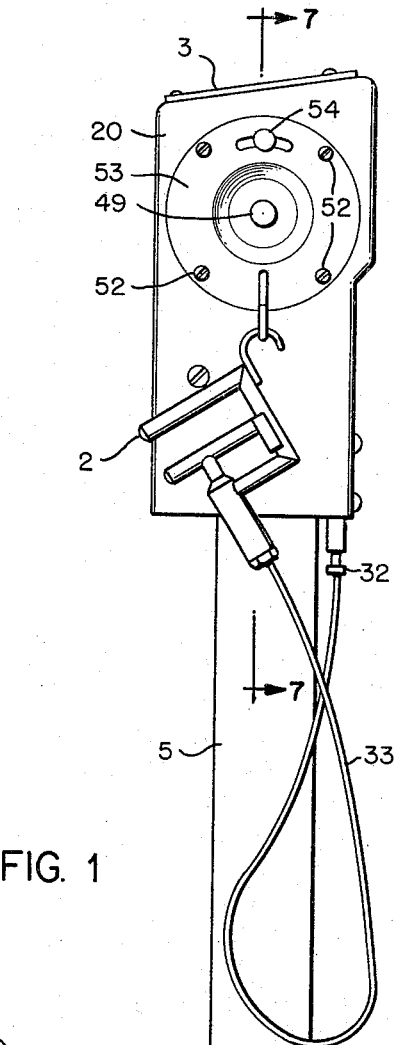
FIG. 1
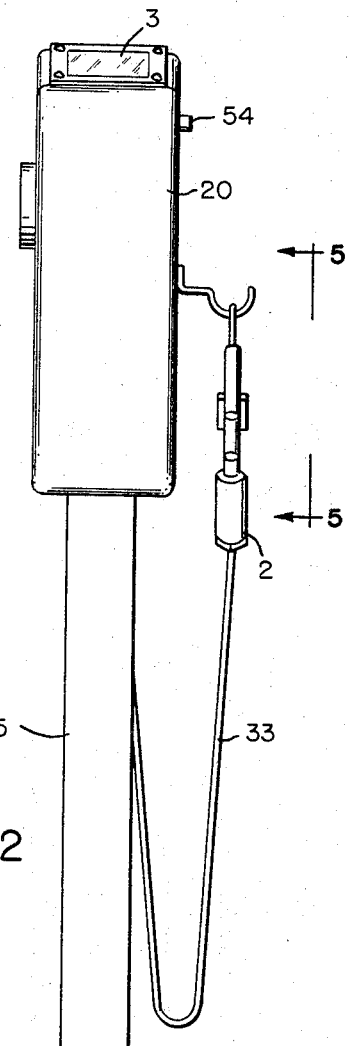
FIG. 2
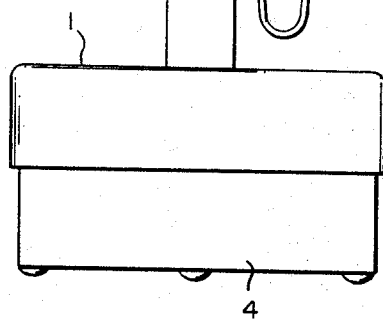
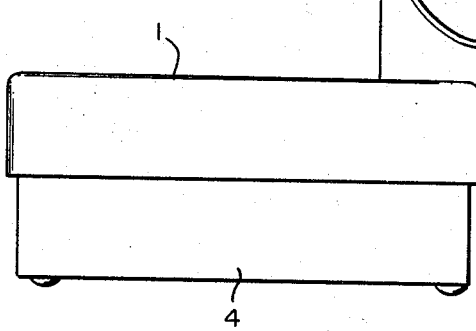
*INVENTOR.*
EDWARD H. CUMPSTON, JR.
BY
*Edward H. Cumpston, Jr.*
ATTORNEY July 4, 1967     E. H. CUMPSTON, JR     3,329,024
METHOD AND MACHINE FOR INDICATING THE FIRMNESS OF A BODY
Filed Dec. 4, 1963     6 Sheets-Sheet 2
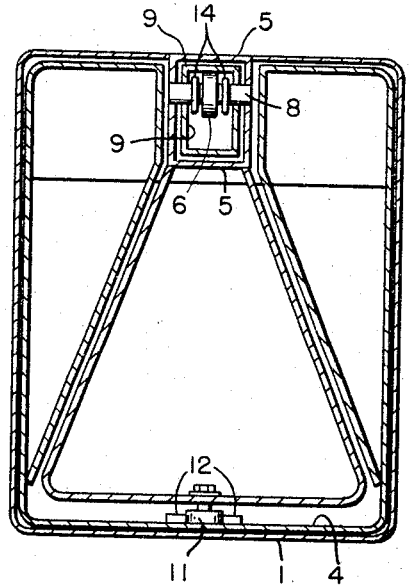
FIG. 4
FIG. 3
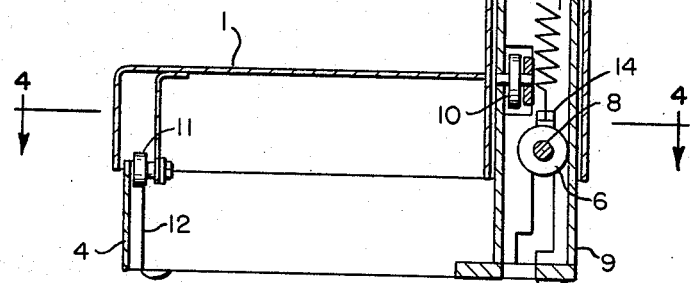
INVENTOR.
EDWARD H. CUMPSTON, JR.
BY
ATTORNEY INVENTOR.
EDWARD H. CUMPSTON, JR.
BY
*Edward H Cumpston, Jr.*
ATTORNEY July 4, 1967     E. H. CUMPSTON, JR     3,329,024
METHOD AND MACHINE FOR INDICATING THE FIRMNESS OF A BODY
Filed Dec. 4, 1963     6 Sheets-Sheet 4

INVENTOR.
EDWARD H. CUMPSTON, JR.

BY
Edward H. Cumpston, Jr.
ATTORNEY

July 4, 1967 E. H. CUMPSTON, JR 3,329,024
METHOD AND MACHINE FOR INDICATING THE FIRMNESS OF A BODY
Filed Dec. 4, 1963 6 Sheets-Sheet 5

INVENTOR.
EDWARD H. CUMPSTON, JR.
BY
Edward H Cumpston, Jr.
ATTORNEY

July 4, 1967   E. H. CUMPSTON, JR   3,329,024
METHOD AND MACHINE FOR INDICATING THE FIRMNESS OF A BODY
Filed Dec. 4, 1963   6 Sheets-Sheet 6

INVENTOR.
EDWARD H. CUMPSTON, JR.
BY
Edward H Cumpston, Sr.
ATTORNEY

United States Patent Office 3,329,024
Patented July 4, 1967

3,329,024
METHOD AND MACHINE FOR INDICATING THE FIRMNESS OF A BODY
Edward H. Cumpston, Jr., 69 Sagamore Road, Bronxville, N.Y. 10708
Filed Dec. 4, 1963, Ser. No. 328,016
5 Claims. (Cl. 73—432)

This invention relates to the determination and indication of the firmness or rigidity of a body. The body might be any one of a number of farm products, or any object where firmness is of interest, but for the purpose of description, the human body will be used.

It is the object of this invention to provide a simple, portable machine which will give a descriptive, definite and accurately repeatable measure of firmness. This measure is independent of the size of the body.

An unyielding body, such as a stone, within the purview of this invention, is 100% firm. A rubber balloon filled with water is by comparison almost completely lacking in firmness. It is the objective of this invention to give a specific firmness number by which these and other bodies may be described.

Figure 5:
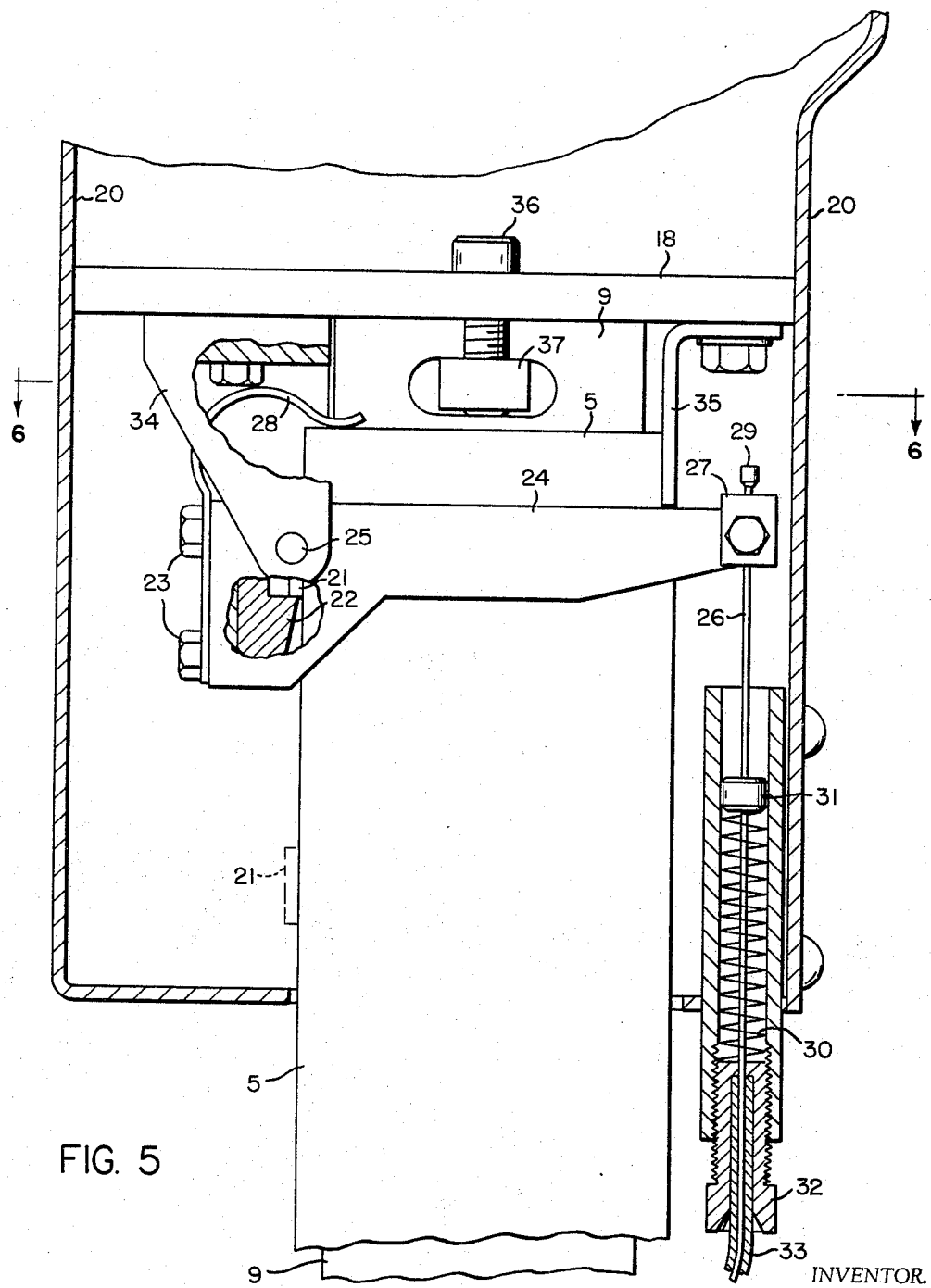
Figure 6:
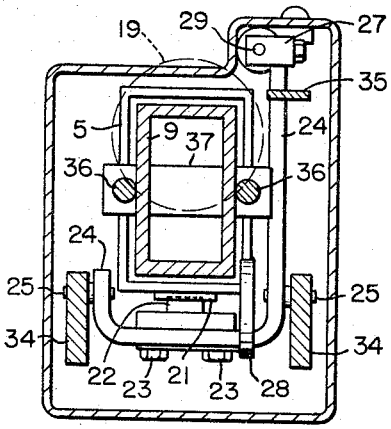
Figure 8:
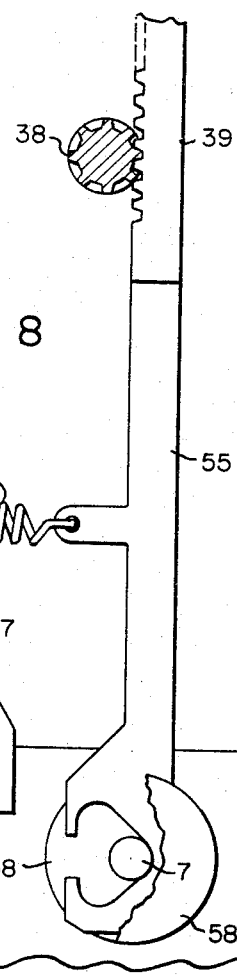
Figure 9:
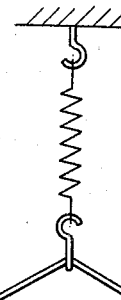
Figure 10:
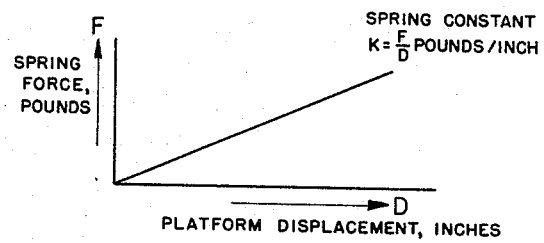
Figure 7:
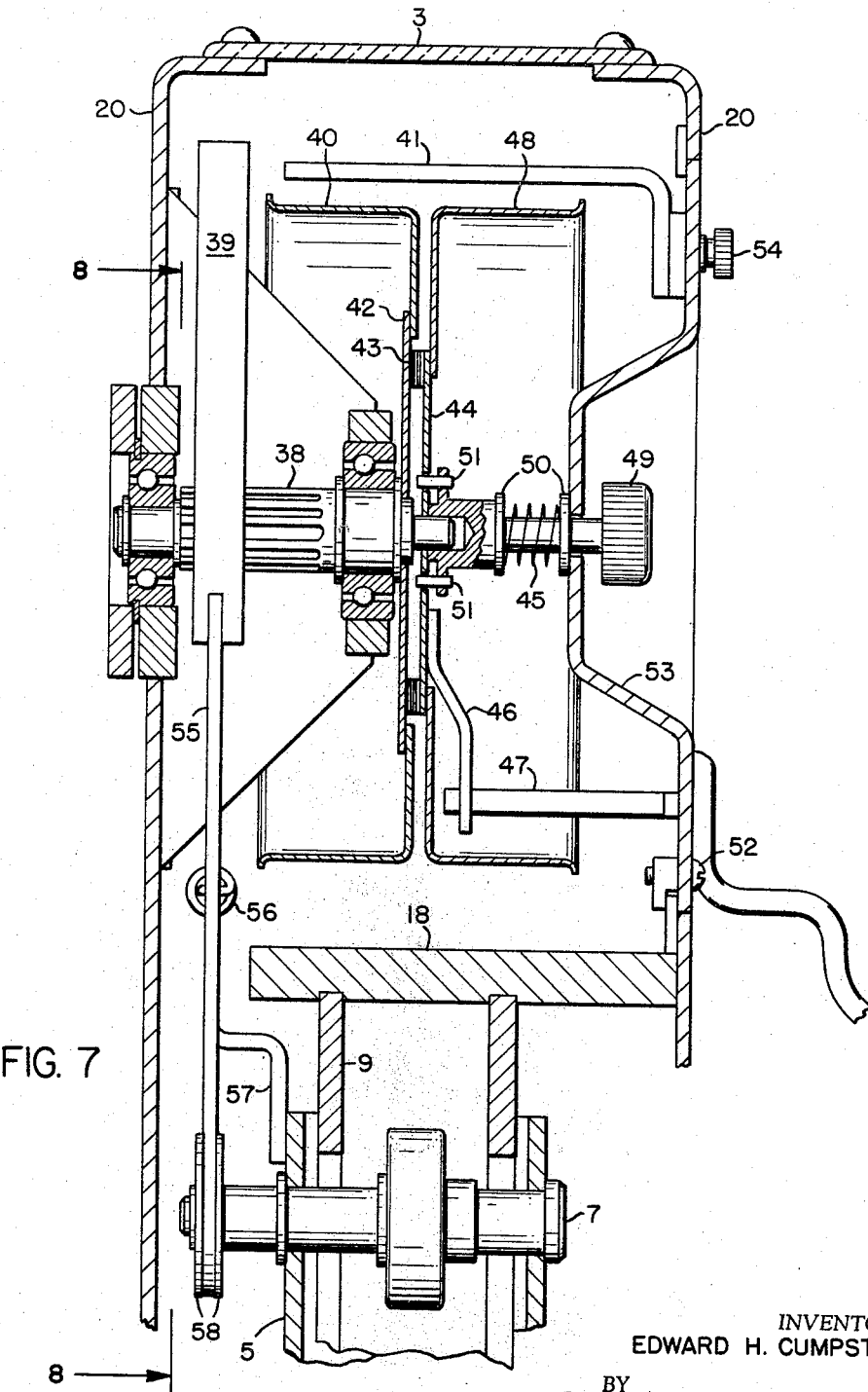
Figure 11:
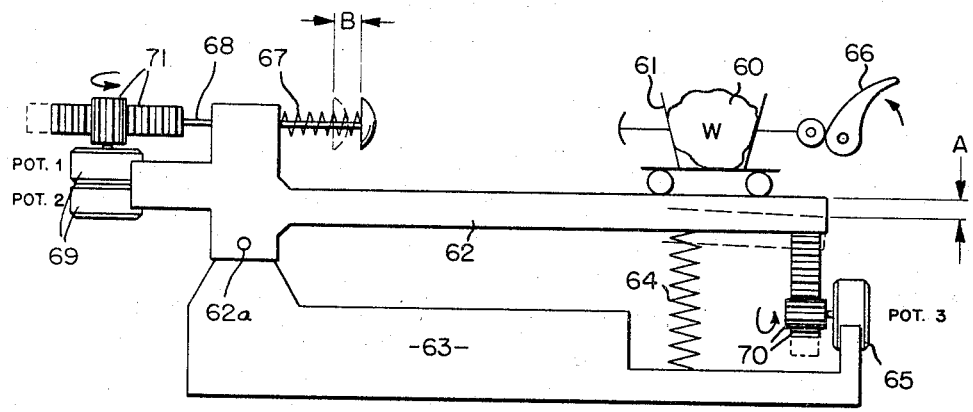
Figure 12:
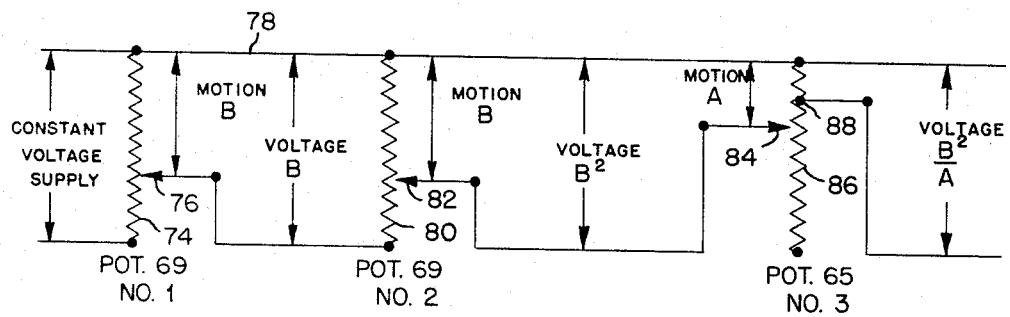

A machine for accurately determining the firmness of a body such as a human being, is described by the following specification and reference to the following drawings:

FIG. 1 is a side elevation of the machine.
FIG. 2 is a front elevation.
FIG. 3 is a cutaway side elevation showing the platform suspension.
FIG. 4 is an enlarged section of the platform and base construction taken along line 4 of FIG. 3.
FIG. 5 is an enlarged fragmentary side elevation with the outside cover removed in the area of line 5 of FIG. 2. FIG. 5 and FIG. 6 show the trigger mechanism.
FIG. 6 is a reduced horizontal section taken along line 6 of FIG. 5.
FIG. 7 is an enlarged front elevation taken along line 7 of FIG. 1. FIG. 7 and FIG. 8 show the readout mechanism.
FIG. 8 is a partial side elevation taken in the area of line 8 in FIG. 7 to show the mounting of the rack and pinion.
FIG. 9 is a diagram of operation of the spring.
FIG. 10 is a schematic diagram of the mathematical analysis.
FIG. 11 is a schematic diagram of an embodiment of this invention for industrial use.
FIG. 12 is a diagram of the electrical circuit for the embodiment of FIG. 11.

The operating principle of this invention will be described with reference to FIGS. 9 and 10 which show an ordinary scale platform supported by a spring. When a firm weight W is placed on the platform (FIG. 9) the spring will be lengthened according to the formula $$K = \frac{F}{D}$$

where K is the spring constant (FIG. 10). The greater the weight, the greater the length. The platform in this case is held in its upper or zero position by a latch and the weight is then placed on the platform, which cannot move. When the latch is released, the weight and platform will drop a distance $X+Y$ (FIG. 9) to a bottom position and then rebound a distance Y and eventually come to an intermediate rest position, down a distance X. With a quality spring and the elimination of sharp impact and friction, the conservation of energy law applies. This states that the sum of the momentum and stored energies in the system must remain constant. At both the zero and bottom positions there is no motion and no momentum energy. Therefore, the stored, or potential, energies in these two positions must be equal. At the zero position all the energy is stored in the weight because of its height and weight and is $W \times (X+Y)$ where $X+Y$ is the total distance of drop or fall. At the bottom position an equal amount of energy must be stored in the spring and is $$\frac{F}{2} \times (X+Y)$$

or $$\frac{K \times (X+Y)}{2} \times (X+Y)$$

since $F = KD$ and $D = (X+Y)$. So $$W \times (X+Y) = \frac{K \times (X+Y)}{2} \times (X+Y)$$

and $$W = \frac{K}{2} \times (X+Y)$$

At the rest position X can be defined from $$K = \frac{W}{X}$$

Substituting gives $$W = \frac{W}{2X} \times (X+Y)$$

or $2X = X+Y$ and $X = Y$. In other words, the bottom position will be precisely twice as far down as the rest position.

This analysis assumes a perfectly firm weight and no friction. Reasonable care in design and construction can make the friction forces in the system so low that they can be neglected. However, if weight W is not firm, the conditions change sharply. Consider a balloon filled with water and let its weight equal W. At the bottom position the balloon will be changing shape because of the dropping forces and it will have internal momentum energy. This momentum energy must be subtracted from the stored energy in the spring, making Y much smaller. Also, as the balloon changes shape there will be internal friction in the rubber and turbulence in the water, both of which will dissipate more energy and make Y smaller still. Y will only be equal to X for a firm body on the platform. As the body becomes less firm, the ratio of Y to X will be less. As with any scale, X is dependent only on the weight of the body and will not change with firmness. Accurate measurements and comparison of X and Y will give an accurate determination of firmness.

A person wishing to keep track of his muscle tone can stand rigidly on the platform of this machine with his weight on his heels and unlatch the platform with a cable release held in his hand. He will receive a gentle but significant bounce on the order of substantially one inch of total drop $(X+Y)$ per 100 pounds of weight. The machine will display on dials his X or actual weight in pounds and his Y or firmness weight in pounds. If the two are nearly equal, he is in excellent trim.

The overall machine is shown in FIGS. 1 and 2, where 1 is the moving platform, 2 is any well known cable release, 3 is the readout window, and 4 the stationary base.

FIGS. 3 and 4 show the basic construction and platform suspension. The platform 1 is welded to a hollow moving column 5 and this entire unit is guided in vertical travel by low friction rollers. Rollers 6 are mounted on shafts 7 and 8 carried by moving column 5 (see also FIG. 7). They run on the inside of hollow fixed column 9 which is welded to base 4. Rollers 6 prevent forward and backward motion. Rollers 10 prevent sideways motion, are carried by fixed column 9, and run on the inside of moving column 5. Roller 11 prevents rotation of platform 1, is carried by platform 1 and runs in track 12 attached to base 4.

Main spring 13 is attached to the platform 1 and moving column 5 through yoke 14 on shaft 8. Main spring 13 extends through fixed column 9 to spring nut 15 which is used to get the desired spring constant K at assembly. Spring nut 15 is pivotally held by yoke 16 which in turn is supported by adjusting screw 17. Screw 17 passes through plate 18 on fixed column 9 and is secured to adjusting wheel 19. Wheel 19 is used to set the spring zero position to the latch position and is accessible through the rear of cover 20. Wheel 19 is shown in a broken line in FIG. 6.

The latching mechanism is shown in FIGS. 5 and 6. In FIG. 5 moving column 5 is shown with a hardened latch surface 21 attached to it. Latch surface 21 prevents downward movement of column 5 and platform 1 when it is caught by hardened latch 22. Latch 22 is secured by bolts 23 to latch arm 24. Arm 24 is mounted at pivots 25 (see also FIG. 6) and at its other end slideably engages release cable 26 by means of clip 27. When cable 26 is pulled by cable release 2, FIGS. 1 and 2, arm 24 turns on pivots 25 and releases latch surface 21, column 5, and platform 1. Arm 24, carrying latch 22, does not produce any friction on column 5 because it stays in the release position until all weight is removed from platform 1, at which time column 5 returns to the zero position to engage return spring 28 which then moves arm to the latching position. Cable 26 is operative in the downward direction by means of button 29 but it cannot return arm 24. Cable 26 is returned by spring 30 pressing on cable button 31 and adjusted in the usual manner by threaded bushing 32 which engages cable tube 33. Pivots 25 are supported from plate 18 by means of bracket 34. Overtravel of arm arm 24 is prevented by stop 35. Plate 18 carries cover 20 and is attached to fixed column 9 by means of screws 36 and plate 37 slid through slots in column 9.

The readout mechanism, FIG. 7, is operated by pinion 38 driven by rack 39. Rack 39 is connected to an extension of shaft 7, FIG. 3, carried by moving column 5. When platform 1 comes to the rest position under a weight, drum 40, which is fixed to pinion 38, will give the exact weight in pounds on its scale read under pointer 41. This is the X of FIG. 9. Pinion 38 is fixed to a disc 42 which in turn has friction surface 43 fixed to it. Friction surface 43 engages a disc 44 loosely rotatable on the shaft of pinion 38, under the action of spring 45 on knob shaft 49, so that disc 44 tries to follow the rotation of disc 42. During the downward motion of platform 1, disc 44 is prevented from turning by adjustable stop 47, through arm 46 on the disc, and drum 48 reads zero under pointer 41. When platform 1 rebounds from its bottom position, disc 44 is free to turn in this direction and will indicate the exact amount of the rebound on drum 48 (so long as the person remains on the platform). This reading on drum 48 in pounds is the Y of FIG. 9, or the firmness weight of the person on the platform.

The readings on drums 40 and 48 are seen through window 3. Before each measurement, drum 48 is reset by turning knob 49, see FIG. 1.

Disc 44 is centered by pinion shaft 38 and is made free turning by mounting spring 45 between low friction washers 50. Knob shaft 49 engages disc 44 through loose fitting pins 51 so as not to interfere with its fit-up to friction surface 43. Stop 47 is adjusted by loosening screws 52 and rotating plate 53. Pointer 41 is adjusted by loosening and sliding knob 54 in a slot in plate 53.

The mounting of rack 39 is shown in FIG. 8, in conjunction with FIG. 7. Plate 55 connects the rack with shaft 7. Spring 56 is connected to plate 55 on one end and to moving column 5 on the other through bracket 57 welded to column 5. Spring 56 holds rack 39 straight and in engagement with pinion 38. This spring also holds the V notch of plate 55 in engagement with shaft 7 and acts as a shock absorber in case of impact on platform 1, or in case the machine is dropped. Plate 55 engages shaft 7 between washers 58 which act as keepers. Spring 56 will change length only under missuse of the machine.

An industrial embodiment of this invention is shown schematically in FIG. 11. The body to be tested for firmness 60 is placed in slide 61, which is free to move back and forth on carriage 62. Carriage 62 is pivotally supported at 62a on base 63 and is held horizontal by spring 64. When the body is placed in slide 61, carriage 62 and spring 64 will deflect by compression of the spring through a distance A. Carriage 62 has a depending rack 70 guided in meshing relation with a pinion connected to the shaft of a single turn, linear potentiometer 65 of any known and suitable commercial type, such for example as that sold by the Potentiometer Division of Litton Precision Products, Inc., of Mount Vernon, N.Y. The potentiometer is thus operated to produce in the circuit hereafter described (FIG. 12) an electrical voltage A which is directly proportional to the weight of body 60.

Slide 61 is then given a constant velocity push along carriage 62 by motorized means such as a motor driven, rotating cam 66. Slide 61 is roller supported and has an arm provided with a roller, as shown, for engagement by cam 66. Cam 66 is given a profile and rotated at a speed to apply a constant velocity to the slide 61. As the slide moves to the left, it engages the head of a spring 67 supported on a rod 68 supported for longitudinal sliding movement in a bearing in carriage 62, thus compressing spring 67 through a distance B. Rod 68 carries with it a rack 71 guided in meshing engagement with a pinion connected to a shaft on which a pair of potentiometers 69 are mounted for actuation. These potentiometers are each single turn, linear potentiometers of the same type as potentiometer 65 described above and connected in circuit as shown in FIG. 12. The conjoint and cumulative action of these potentiometers produces a voltage which is the square of motion B in terms of its percentage of full or maximum travel, as hereafter explained. The pinions engaging racks 70 and 71 are connected to the shafts of their respective potentiometers by clutches, or ratchets, or other known constructions driving in one direction to actuate the shafts, but idling in the other direction, so that the potentiometers remain in the position of maximum travel until reset to zero position, manually or by connection to the motor driving cam 66. After pushing slide 61, cam 66 is returned to starting position. After compressing spring 67, slide 61 is returned by spring 67 to starting position in contact with the cam 66.

In FIG. 12 a constant voltage is supplied to a first of the potentiometers 69 across its resistance 74 over which a contact 76 is moved over the distance B through which spring 67 and its rod and rack 71 are moved by slide 61. The voltage B from this included resistance is supplied to a second of the potentiometers 69 across its resistance 80 which extends from line 78 and is the same as resistance 74. A contact 82 is moved from side 78 of resistance 80 through the same distance of motion B of the spring 67. The voltage $B^2$ from this included resistance is supplied to a contact 84 movable over a resistance 86 which extends from line 78 and is the same as resistances 74 and 80. Contact 84 is moved by rack 70 and pinion over the distance A from line 78. A stationary tap 88 is connected to resistance 86 at a convenient distance from line 78 to include a convenient fraction, as 0.01, of the whole or maximum resistance 86. Voltages B and B² are respectively related to motion B, and motion A is proportional to the weight of the body (W). The voltage included between line 78 and tap 88 is represented by $B^2/A$ which may be applied to operate a meter for visual use, or the switch of an electric circuit controlling a conveyor for feeding and discharging bodies to be tested for firmness.

Thus assuming impression of a constant voltage supply of 100 volts and a motion B of 40% of the possible maximum travel of contact 76, the output voltage B of the first of potentiometers 69 would be 40 volts. This input into the second of potentiometers 69 would produce an output voltage $B^2$ of 16 volts. Assuming for the whole resistance 86 a value of 100 ohms and a resistance between line 78 and tap 88 of 1 ohm, and a motion A of 50% of the maximum possible travel of contact 84, the input to potentiometer 65 would be across a resistance of 50 ohms, but the output of this potentiometer would be across only 1 ohm at the tap 88, or 1/50 of its input $B^2$ (0.32 volt). This output thus be a voltage directly proportional to $B^2/A$, or firmness of body 60, for the uses aforesaid.

The operating principle of this industrial machine is described by the following mathematical analysis which clearly shows its similarity to the described machine for use to measure the firmness of human bodies.

The energy of the body, E, traveling at contant velocity, V, is $$E = \frac{1}{2} \times \frac{W}{g} V^2$$

where W is the weight of the body and $g$ is the gravity constant. Since V and $g$ are constants, this can also be written $$E = \frac{W}{2} C$$

where C is a constant. As in FIG. 10 the formula for springs 64 and 67 is the constant $K = F/D$, where F represents force and D distance, and from FIG. 11 it can also be written as $K = W/A$. Springs 64 and 67 can be constructed to have the same constant, K. At its maximum deflection spring 67 will have a stored energy, SE, equal to its average force times its total deflection, or $$SE = \frac{F \text{ Max.}}{2} \times D = \frac{KD}{2} \times D = \frac{KD^2}{2}$$

At the instant of maximum deflection of spring 67 there will be no motion in the system and conservation of energy says that $E = SE$, or $$\frac{W}{2} \times C = \frac{KD^2}{2}$$

Substituting for K gives $$\frac{W}{2} \times C = \frac{W}{2} \frac{D^2}{A}$$

or $$\frac{D^2}{A} = \text{constant } C$$

as $W/2$ cancels out. The D of the spring formula is also the B of FIG. 11, so $B^2/A$ is also a constant independent of weight W. It can be seen that if $B^2/A$ is a constant, signal $B^2/A$ from potentiometer 65 will also be a constant independent of weight. If body 60 is not completely firm it will absorb energy upon impact with spring 67, SE will necessarily be less, and signal $B^2/A$ will show a decrease in firmness. Signal $B^2/A$ is therefore a precise measure of the firmness of body 60.

The re-setting of potentiometers 65 and 69 and the positioning of slide 61 can be readily accomplished by timed connections to the motor means used to drive cam 66. It is evident that many variations of this system are possible using the basic approach that is disclosed.

While obviously useful and advantageous, it will be seen that it is not necessary to weigh the body in these machines, since the weight can be already known or separately determined for comparison with the indication of firmness.

It can be seen that this machine is larger and performs more functions than an ordinary scale, however, since its motions are an order of magnitude larger, its required precision of manufacture is correspondingly much less.

I claim:

1. A machine for determining and indicating the firmness of a body, comprising a base, a support for said body movable vertically on said base, means for holding said support on said body stationary on said base, means for subjecting said support and body to downward movement by the force of gravity substantially without external friction, spring means for resisting and arresting said movement of said body and for moving said body in an opposite direction to a position intermediate said stationary position thereof and the lowermost position produced against said spring means, a pair of scales on said base each marked with the same units of weight relative to deformation of said spring means, indicating means connected with said support and movable thereby over one of said scales for indicating the amount of downward movement to said intermediate position to indicate the weight of said body, and firmness indicating means connected with said support and movable thereby over the other of said scales during movement of said support in said opposite direction only for indicating the amount of movement in said opposite direction, to afford a comparison and ratio of said movements to indicate the firmness of said body.

2. A machine for determining and indicating the firmness of a body having the construction specified in claim 1 and further characterized by the provision of clutch means connecting said support and firmness indicating means and operative during movement of said support and body in said opposite direction only, to afford a comparison and ratio of said movements to indicate the firmness of said body.

3. A machine for determining and indicating the firmness of a body having the construction specified in claim 2 and further characterized by the provision of means for holding said firmness indicating means against movement during said downward movement of said support and body and releasing said firmness indicating means for movement by said clutch means during movement of said support and body in said opposite direction, to afford a comparison and ratio of said movements to indicate the firmness of said body.

4. The method of determining the firmness of a body comprising the steps of determining the weight of said body, subjecting said body to motion with an energy proportional to the weight of said body, arresting said motion of said body by a resilient force determining the deformation of said resilient force by said motion of said body and comparing the amplitude of said deformation with said weight to afford a ratio indicative of the firmness of said body.

5. The method of determining and indicating the firmness of a body comprising the steps of stationarily supporting said body, subjecting said body to motion by the force of gravity, applying to said body a deformable resilient force for decelerating the downward movement of said body and for moving said body in an upward direction to an intermediate position corresponding to the weight of said body, indicating said weight in predetermined scale units, and indicating said upward movement in said scale units for comparison with said units of weight to afford the ratio of said units and thereby indicate the firmness of said body.

References Cited

UNITED STATES PATENTS

| | | | |
|---|---|---|---|
| 1,504,871 | 8/1924 | Covington | 73—79 |
| 2,207,996 | 7/1940 | Basquin | 177—1 |
| 3,158,217 | 11/1964 | Johnson | 177—154 X |
| 3,214,966 | 11/1965 | Menzies | 73—79 |

FOREIGN PATENTS 657,133  2/1938  Germany.

RICHARD C. QUEISSER, *Primary Examiner.*

E. D. GILHOOLY, *Assistant Examiner.*